(12) United States Patent
Anderson et al.

(10) Patent No.: US 11,854,260 B2
(45) Date of Patent: Dec. 26, 2023

(54) SITUATION-SENSITIVE SAFETY GLASSES (71) Applicant: AUTODESK, INC., San Francisco, CA (US)

(72) Inventors: Fraser Anderson, Alberta (CA); Jun Gong, Hanover, NH (US); George Fitzmaurice, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 536 days.

(21) Appl. No.: 16/516,105

(22) Filed: Jul. 18, 2019

(65) Prior Publication Data

US 2021/0019524 A1 Jan. 21, 2021

(51) Int. Cl.
*G06V 20/20* (2022.01)
*G06F 3/01* (2006.01)
*G06V 40/18* (2022.01)
*G02C 11/00* (2006.01)
*G02B 27/01* (2006.01)

(52) U.S. Cl.
CPC .......... *G06V 20/20* (2022.01); *G02B 27/017* (2013.01); *G02C 11/10* (2013.01); *G06F 3/013* (2013.01); *G06V 40/18* (2022.01); *G06V 40/193* (2022.01); *G02B 2027/0178* (2013.01)

(58) Field of Classification Search
CPC .......... G06K 9/00671; G06K 9/00597; G06K 9/0061; G06F 3/013
See application file for complete search history.

(56) References Cited

U.S. PATENT DOCUMENTS

| | | | | |
|---|---|---|---|---|
| 2004/0239509 | A1* | 12/2004 | Kisacanin | A61B 5/18 340/575 |
| 2011/0169625 | A1* | 7/2011 | James | B60W 30/095 340/439 |
| 2015/0002394 | A1* | 1/2015 | Cho | G02B 27/0093 345/156 |
| 2017/0148183 | A1* | 5/2017 | Saitwal | G06K 9/2054 |
| 2018/0042477 | A1* | 2/2018 | Seitz | G02C 13/005 |
| 2019/0236931 | A1* | 8/2019 | Strebel | H04W 4/026 |
| 2019/0250705 | A1* | 8/2019 | Zhang | G06F 3/0304 |
| 2020/0065584 | A1* | 2/2020 | Iyer | G06T 7/70 |
| 2020/0334823 | A1* | 10/2020 | Bleyer | G06T 11/00 |

* cited by examiner

*Primary Examiner* — Grace Q Li
(74) *Attorney, Agent, or Firm* — Artegis Law Group, LLP (57) ABSTRACT

Techniques disclosed herein combine computer vision with eye tracking by identifying, via computer vision, safety hazards in a video captured by a camera mounted on a pair of safety glasses, and generating an alert if a user wearing the safety glasses has not (recently) noticed the hazard. Whether the user has noticed the hazard is determined based on eye tracking information extracted from a video captured by another camera that is mounted on the safety glasses and points toward the user. As a result, safety hazards may be automatically detected and reported to the user. In addition, only those hazards that have not been (recently) noticed by the user cause an alert to be generated, so the user is not distracted with unnecessary notifications.

16 Claims, 6 Drawing Sheets

SITUATION-SENSITIVE SAFETY GLASSES

BACKGROUND

Field of the Disclosure

Embodiments of the present disclosure relate generally to safety equipment and, more specifically, to situation-sensitive safety glasses.

Description of the Related Art

Workers at job sites, such as factories and construction sites, are often exposed to safety hazards. For businesses, safety infractions can cause significant delays, injuries to workers, and higher insurance rates. Currently, workers at job sites use their natural senses to look and listen for safety hazards. However, safety hazards sometimes go unnoticed or unattended, and there are few, if any, effective techniques right now for notifying workers of safety hazards that they do not notice.

As the foregoing illustrates, what is needed in the art are more effective techniques for detecting and notifying workers of safety hazards.

SUMMARY

One embodiment of the present disclosure sets forth a computer-implemented method for generating safety hazard alerts. The method includes receiving a first image frame captured by a first camera and at least one second image frame captured by a second camera. The first camera and the second camera are secured to a pair of safety glasses, the first camera points away from a user wearing the safety glasses, and the second camera points toward the user. The method further includes determining, based on the first image frame, a location of a hazard, and determining, based on the at least one second image frame, at least one eye location. In addition, the method includes determining, based on the location of the hazard and the at least one eye location, that the user has not noticed the hazard, and responsive to determining the user has not noticed the hazard, causing an alert to be generated.

Another embodiment of the present disclosure sets forth a pair of safety glasses. The safety glasses include a frame and one or more lenses. The safety glasses further include a first camera secured to the frame, the first camera being pointed in front of the safety glasses. In addition, the safety glasses include a second camera secured to the frame, the second camera being pointed toward a back of the safety glasses.

One advantage of the disclosed techniques relative to the prior art is that a pair of safety glasses is provided for automatically detecting and reporting safety hazards in a work environment, which differs from the manual identification of such hazards via a user's natural senses. In addition, the disclosed techniques leverage eye gaze data to accurately distinguish between hazards that the user has and has not noticed, so as to avoid distracting the user with unnecessary alerts of hazards that the user has already noticed. These technical advantages represent one or more technological advancements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present disclosure. However, it will be apparent to one of skilled in the art that the present disclosure may be practiced without one or more of these specific details.

System Overview

Figure 1:
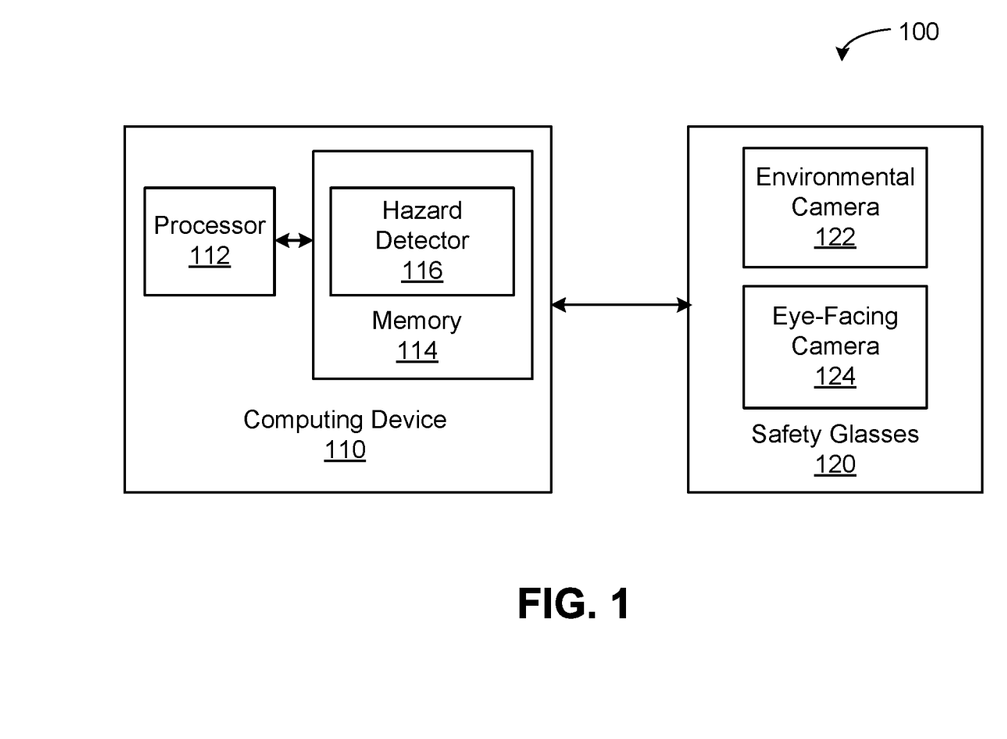
FIG. 1 is a conceptual illustration of a system configured to implement one or more aspects of various embodiments.

FIG. 1 is a conceptual illustration of a system 100 configured to implement one or more aspects of various embodiments. As shown, the system 100 includes, without limitation, a computing device 101 and a pair of safety glasses 120 in communication with the computing device 101. For example, the safety glasses 120 could be connected to the computing device 101 via a data cable, such as a USB (Universal Serial Bus) cable. As another example, the safety glasses 120 and the computing device 101 could communicate over a network, such as the Internet, a local area network (LAN), or any other suitable network.

As shown, the computing device 110 includes without limitation, a central processing unit (CPU) 112 and a system memory 114. The computing device 110 may further include input devices, a graphics processing unit (GPU), and a display device (not shown).

The CPU 112 receives user input from the input devices, such as a keyboard or a mouse. In operation, the CPU 112 is the master processor of the computing device 110, controlling and coordinating operations of other system components. In particular, the CPU 112 may issue commands that control the operation of a GPU. The GPU incorporates circuitry optimized for graphics and video processing, including, for example, video output circuitry. The GPU delivers pixels to a display device that may be any conventional cathode ray tube, liquid crystal display, light-emitting diode display, or the like.

In various embodiments, a GPU may be integrated with one or more of other elements of the computing device 110 to form a single system. For example, the GPU may be integrated with the CPU 112 and other connection circuitry on a single chip to form a system on chip (SoC). In alternate embodiments, the CPU 112 and/or the GPU may be replaced with any number of processors. Each of the processors may be any instruction execution system, apparatus, or device capable of executing instructions. For example, a processor could comprise a digital signal processor (DSP), a controller, a microcontroller, a state machine, or any combination thereof.

The system memory 114 stores content, such as software applications and data, for use by the CPU 112 and the GPU. The system memory 114 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the system memory 114. The storage may include any number and type of external memories that are accessible to the CPU 112 and/or the GPU. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the computing device 110 shown herein is illustrative and that variations and modifications are possible. The number of CPUs 112, the number of GPUs the number of system memories 114, and the number of applications included in the system memory 114 may be modified as desired. Further, the connection topology between the various units in FIG. 1 may be modified as desired. In some embodiments, any combination of the CPU 112, the GPU, and the system memory 114 may be replaced with any type of virtual computing system, distributed computing system, or cloud computing environment, such as a public or a hybrid cloud.

As shown, the system memory 114 stores a hazard detection application 116 ("hazard detector"). As discussed in greater detail below, the hazard detector 116 is configured to identify and notify a user of safety hazards by combining (1) computer vision detection of hazards in a video captured by an environmental camera 122 mounted on the safety glasses 120, with (2) eye tracking information derived from a video captured by an eye-facing camera 124 mounted on the safety glasses 120. As used herein, a "hazard" may include one or more objects that, either separately or in combination, are hazardous to a user, as well as situations that are hazardous to the user. Examples of hazardous objects include open pits, tripping hazards, and shrapnel. Examples of objects that represent a hazard in combination include exposed wiring and standing water, and excavated areas surrounded by flags. Examples of hazardous situations include equipment moving closer to the user. In some embodiments, the hazard detector 116 may compare the location of a detected safety hazard in the video captured by the environmental camera 122 to determined pupil locations, also referred to herein as "eye locations," in the video captured by the eye-facing camera 124 and mapped to the environmental space. The hazard detector 116 may then cause an alert (e.g., an audio, vibrational, and/or visual alert) to be generated if the mapped eye locations for a previous period of time are more than a predefined distance from the hazard, indicating that the user has not recently looked at the hazard.

Although shown as running in the computing device 110, in some embodiments the safety glasses 120 may include a memory and a processor capable of running the hazard detector 116. In such cases, the computing device 110 may be omitted. That is, in some embodiments, the safety glasses 120 may be a self-contained device that includes built-in computational power necessary to perform real-time vision processing via the hazard detector 116.

Figure 2:
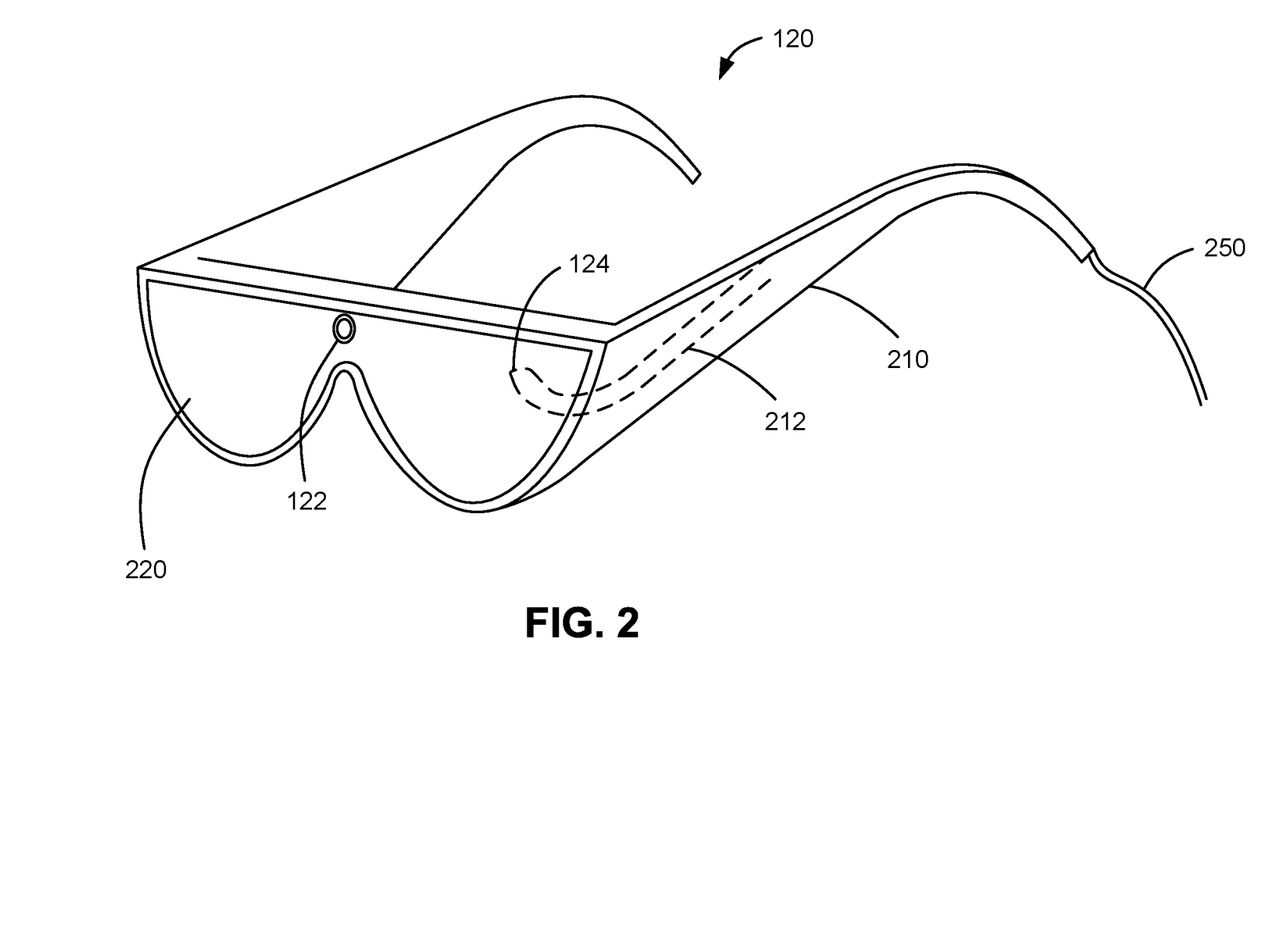
FIG. 2 illustrates an exemplary pair of safety glasses, according to various embodiments.

FIG. 2 illustrates in greater detail an exemplary pair of the safety glasses 120, according to various embodiments. As shown, the safety glasses 120 include a frame 210 and lenses 220. The safety glasses 120 further include the environmental camera 122 and the eye-facing camera 124, which are mounted on the frame 210. In addition, the safety glasses 120 include a data cable 250 that connects the environmental and eye-facing cameras 122 and 124 to the computing device 110. In alternative embodiments, the safety glasses 120 may include a wireless communication card or other device that permits the safety glasses 120 to communicate with the computing device 110 via a network.

As used herein, a "frame" of the safety glasses 210 refers to any structure capable of holding lenses in front of a wearer's eyes. Although an exemplary pair of safety glasses 120 including the frame 210 and the lenses 220 is shown for illustrative purposes, it should be understood that the frame and lenses of safety glasses according to embodiments may include any design and be constructed from any suitable materials. For example, the frame 210 and the lenses 220 could be constructed from polycarbonate. Further, the lenses 220 may be prescription or non-prescription lenses.

As shown, the environmental camera 122 is mounted on the frame 210 so as to point in front of the safety glasses 120, away from a user who wears the safety glasses 120. By contrast, the eye-facing camera 124 is mounted on a protruding arm 212 of the frame 210, such that the eye-facing camera 124 is pointed toward a back of the safety glasses 120, i.e., toward a user who wears the safety glasses. More generally, the environmental and eye-facing cameras 122 and 124 may be secured to the frame of the safety glasses 120 in any technically feasible manner.

In operation, the environmental camera 122 captures and transmits to the hazard detector 116 a video depicting the environment in front of the safety glasses 120. At the same time, the eye-facing camera 124 captures and transmits to the hazard detector 116 a video depicting the user's face and, specifically, the user's eyes. Although discussed herein primarily with respect to the environmental and eye-facing cameras 122 and 124 capturing videos comprising image frames, it some embodiments one or both of the environmental and eye-facing cameras 122 and 124 may capture individual images that are not included in a video.

As described, image frames of videos captured by the environmental and eye-facing cameras 122 and 124 may be transmitted to the hazard detector 116 in any technically feasible manner, such as via the data cable 250 or a network (not shown). In turn, the hazard detector 116 processes the image frames captured by the eye-facing camera 124 to determine pupil locations therein. Initially, a calibration procedure may be performed to establish a mapping between pupil locations in image frames captured by the eye-facing camera 124 and locations within image frames captured by the environmental camera 122. For example, visual targets such as stickers could be placed at known locations within the environment, and the hazard detector 116 could prompt the user to fixate his or her gaze on each visual target in turn. Further, the hazard detector 116 could record correspondences between the locations of the visual targets in image frames captured by the environmental camera 122 and the pupil locations in the image frames captured by the eye-facing camera 124. For example, the hazard detector 116 could store such correspondences in a matrix of correspondences, thereby creating a mapping between the real-world space and the eye-tracker space. That is, the hazard detector 116 may create a 3D spatial calibration between the real-world and eye-tracker spaces by having the user look at visual targets placed in the environment and restricting the movement of the user. Although discussed herein primarily with respect to pre-calibration using a set of visual targets, in alternative embodiments such pre-calibration may not be required. For example, monocular computer vision techniques may be employed to provide robust, real-time tracking of 3D positions without needing to pre-calibrate to a set of visual targets.

Some embodiments may also account for the safety glasses 120 moving on the user's head as the user wears the safety glasses 200. In such cases, the hazard detector 116 may continuously re-calibrate the initial calibration. For example, visual targets (e.g., stickers) could be fixed at known places within an environment. The hazard detector 116 could then perform continuous re-calibration based on locations of such visual targets in image frames captured by the environmental camera 122, by determining whether the visual targets have moved (relative to the user head position) and adjusting the calibration to account for such movement.

Subsequent to calibration, the hazard detector 116 may detect a hazard in an image frame captured by the environmental camera 122 and alert a user to the same. In some embodiments, the hazard detector 116 only generates such an alert if the user's eye location within a predefined time period (e.g., up to several minutes ago) has not been within a predefined distance of the hazard, indicating that the user has not looked at the hazard recently. In particular, the hazard detector 116 may map pupil locations, which as described may be determined from image frames captured by the eye-facing camera 124, to locations within the image frame captured by the environmental camera 122, based on the calibration described above. The hazard detector 116 may then cause an alert to be generated if none of the mapped locations are within a predefined distance (e.g., a number of pixels) of the hazard. In some embodiments, the safety glasses 120 may also include integrated output device(s), such as an audio device, a haptic device, and/or a display device. The hazard detector 116 could cause such an audio device, haptic device, and/or display device to play an alert sound, vibrate, or display a visual alert, respectively, when a hazard is detected that the user has (recently) looked at.

If, on the other hand, the user's eye location has (recently) been within the predefined distance of the hazard, then the hazard detector 116 may not generate an alert. Doing so avoids bombarding the user with distracting notifications of safety hazards that the user has already noticed.

Figure 3:
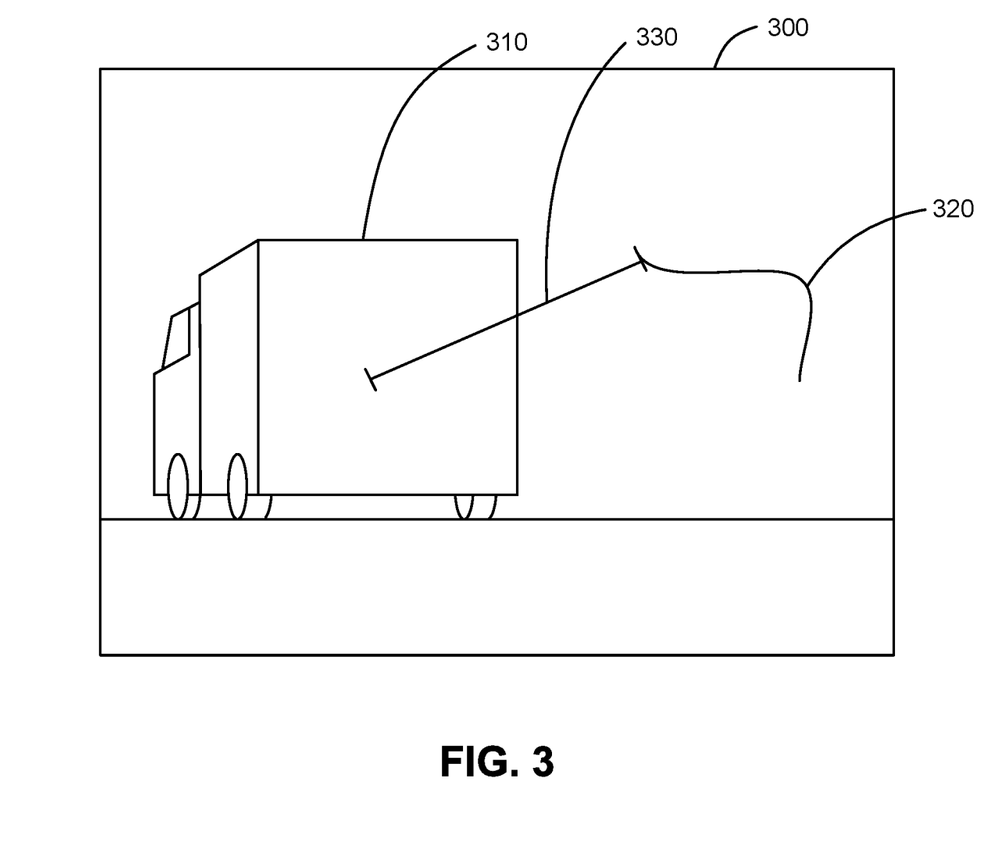
FIG. 3 illustrates an approach for detecting and reporting a hazard, according to various embodiments.

FIG. 3 illustrates an example of detecting and reporting a hazard, according to various embodiments. As shown, the hazard detector 116 receives an image frame 300 depicting an object 310 that represents a hazard. The image frame 300 is captured by the environmental camera 124 and may be included in a video, or alternatively an individual image.

Illustratively, the object 310 depicted in the image frame 300 is the back of a truck, which may be hazardous to a user wearing the safety glasses 120 if the truck is backing up. Although a particular hazard involving the object 310 is shown for illustrative purposes, it should be understood that the hazard detector 116 may be configured to detect any hazards(s), and what is considered hazardous may generally vary across different environments. As described, examples of hazards include open pits, excavated areas surrounded by flags, tripping hazards, shrapnel, exposed wiring near standing water, equipment moving toward a user, etc.

The hazard detector 116 may employ any technically feasible approach to detect the hazardous object 310. For example, in some embodiments, hazards may be encoded using template images that are stored in a database. In such cases, the hazard detector 116 may compare the image frame 300 to the template images and determine whether any of the template images appears, partially or wholly, within the image frame 300. In particular, the hazard detector 116 may correlate each template image across different sizes and locations in the image frame 300 and determine whether a sufficiently sharp object and highly correlated object is identified, indicating the template image object is depicted in the image frame 300. In the context for FIG. 3, the hazard detector 116 could compare the image frame 300 with a stored template image of the back of a truck to identify that the back of the truck depicted in the image frame 300 is a hazard.

In other embodiments, hazards may be encoded using features representative of those hazards. For example, features could be computed for images depicting hazards and stored in a database. Any suitable features may be utilized, including statistical features such as scale-invariant feature transform (SIFT) features or latent features derived from, e.g., machine-learning based modeling. Such features may include numerical representations of contents of the images (e.g., average brightness, number of corners, etc.) that are more amenable to classification (or simply better representations of the image). The hazard detector 116 could then compare features computed for the image frame 300 with the stored features of the back of a truck in order to identify the back of the truck depicted in the image frame 300 as a hazard.

In further embodiments, the hazard detector 116 may use a deep learning model, such as a convolutional neural network, that is trained to classify objects such as the back of a truck as being hazardous. In such cases, the hazard detector 116 could feed the image frame 300 into the trained machine learning model in order to identify the back of the truck depicted in the image frame 300 as a hazard.

Although a single hazardous object 310 is shown for illustrative purposes in FIG. 3, in some embodiments, the hazard detector 116 may also be configured to identify hazards based on multiple detected objects in proximity to, or in association with, each other. For example, an exposed electrical wire appearing along with, or close to, standing water in an image frame could be detected as a hazard and reported to the user. In such a case, the exposed electrical wire, the standing water, and their distance from each other may be determined in any technically feasible manner. For example, the hazard detector 116 could extract features from the image frame and detect the exposed electrical wire and the standing water by matching their features to known features of exposed electrical wiring and water. The hazard detector 116 could then determine a pixel distance between the detected exposed electrical wire and the standing water and notify the user of the hazard if eye tracking data indicates the user has not looked at the exposed electrical wire or the standing water.

The hazard detector 116 determines a distance (e.g., the distance 330) between each recorded location where a user has recently looked and the hazardous object 310. Illustratively, locations where the user has looked within a previous amount of time (e.g., a few minutes or seconds) are shown as the locations 320. In some embodiments, the hazard detector 116 may store pupil locations, determined from image frames captured by the eye-tracking camera 124, for up to a predefined amount of time (e.g., several seconds or minutes). The hazard detector 116 may then map the stored pupil locations to the image frame 300, based on a calibration of the eye-tracking camera 124 with the environment camera 122, and determine the pixel distance between the mapped pupil locations 320 and the object 310. Although pixel distance is discussed herein as an example, the hazard detector 116 may generally use any suitable measure of distance. For example, the hazard detector 116 could determine whether the stored locations where the user has looked maps to locations within a bounding box of the object 310 in the image frame 300. As another example, the hazard detector 116 could convert the pixel distance between the locations where the user has looked and the object 310 to a real-world distance.

If the hazard detector 116 determines that the stored pupil locations are not within a predefined distance from the hazardous object 310, then the hazard detector 116 causes an alert to be generated. Any technically feasible alert may be generated. For example, in some embodiments, the safety glasses 120 may include one or more integrated output devices, such as an audio device that plays an alert sound, a haptic device that vibrates, or a display device that shows a visual alert (e.g., highlighting the hazard). In such cases, the hazard detector 116 may transmit a signal to the safety glasses 120, causing the integrated output device(s) therein to generate the associate alert(s). In other embodiments, the output device(s) may be distinct from the safety glasses 120. For example, output device(s) may be included in the computing device 110 in which the hazard detector 116 executes, or elsewhere.

Figure 4:
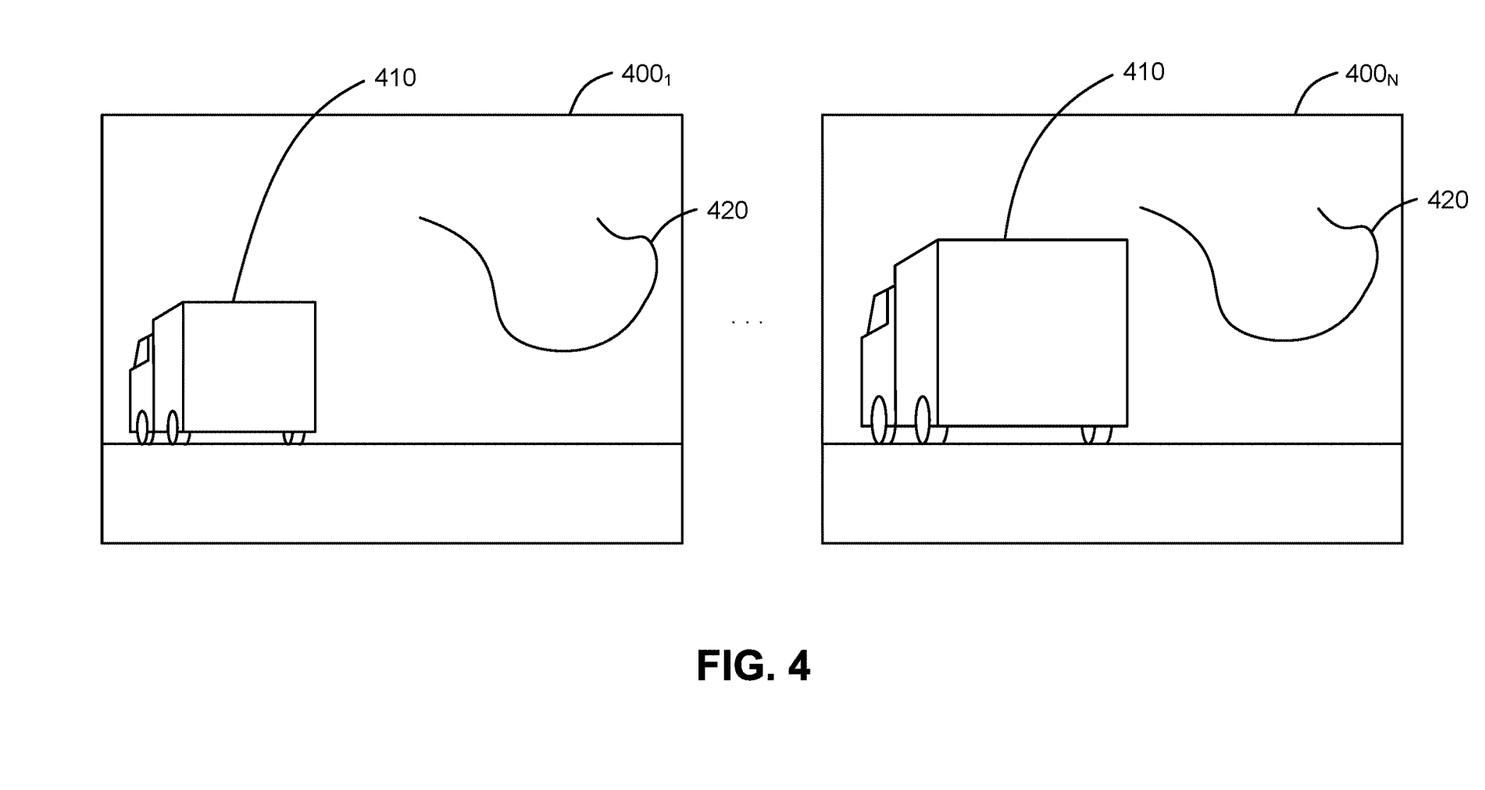
FIG. 4 illustrates another approach for detecting and reporting a hazard, according to other various embodiments.

FIG. 4 illustrates another example of detecting and reporting a hazard, according to various embodiments. As shown, the hazard detector 116 receives a series of image frames $400_{1-N}$ depicting an object 410. Similar to the image frame 300, the image frames $400_{1-N}$ are captured by the environmental camera 124.

Once again, the object 410 depicted in the image frames $400_{1-N}$ is the back of a truck, which may be hazardous if the truck is backing up. Illustratively, the size of the object 410 increases across the image frames $400_{1-N}$, indicating that the object 410 is getting closer to the user. In this example, the hazard detector 116 is configured to recognize the hazardous situation that the back of a truck is approaching the user, which is identified based on a size (e.g., a bounding box) of the truck object 410 increasing across multiple image frames, as opposed to simply detecting the back of the truck in a single image frame. Similar to the discussion above with respect to FIG. 3, the hazard detector 116 determines locations 420 in the image frame $400_N$ to which stored pupil locations determined from image frames captured by the eye-tracking camera 124 map, and if none of those pupil locations 420 are within a predefined distance from the object 410 in any of the image frames $400_{1-N}$, then the hazard detector 116 causes an alert to be generated, via an output device integrated in the safety glasses 120 or elsewhere.

Figure 5:
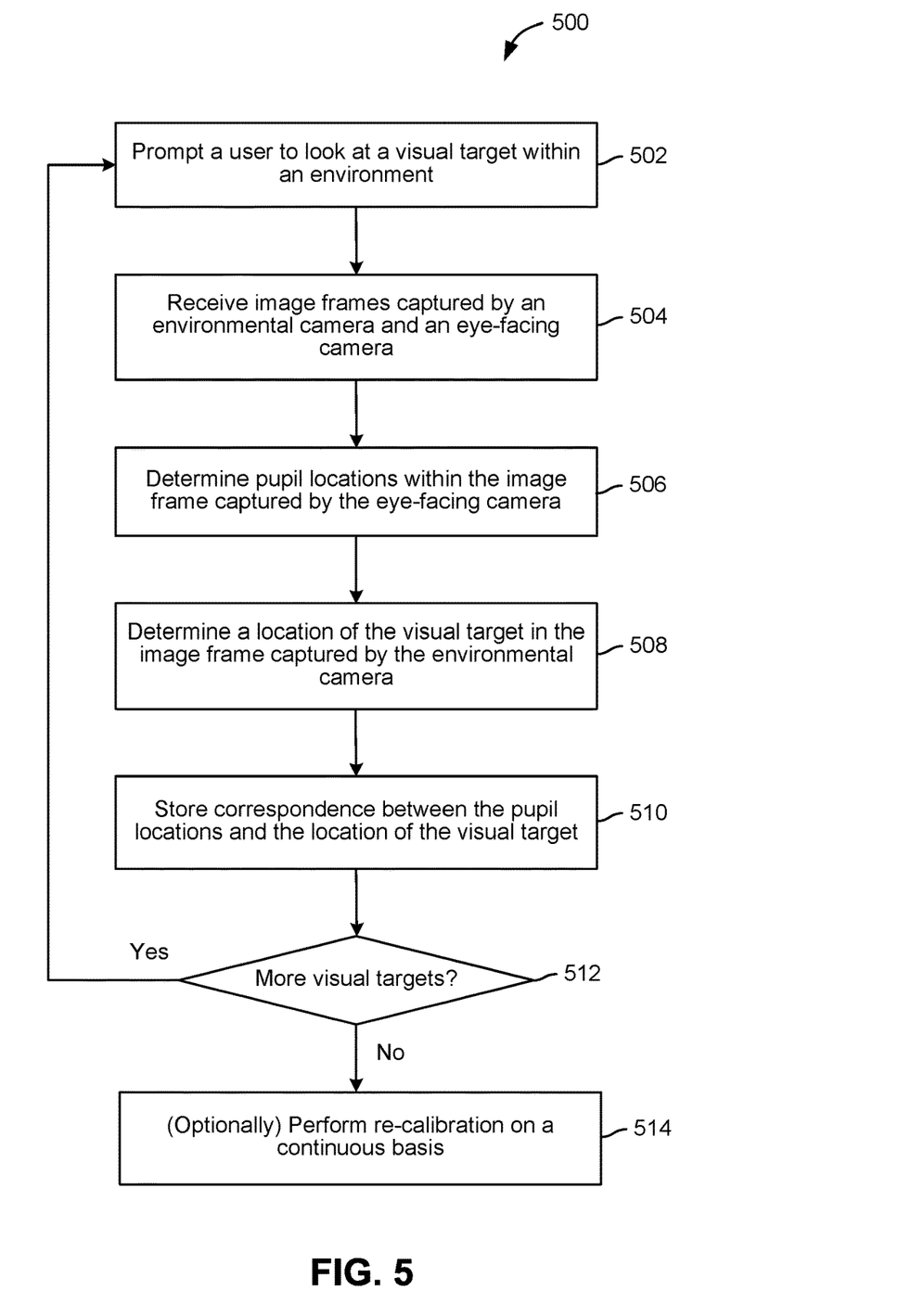
FIG. 5 sets forth a flow diagram of method steps for calibrating inputs from an eye-facing camera and an environmental camera, according to various embodiments.

FIG. 5 sets forth a flow diagram of method steps for calibrating inputs from an eye-facing camera and an environmental camera, according to various embodiments. Although the method steps are described with reference to the systems of FIGS. 1-2, persons skilled in the art will understand that any system configured to implement the method steps, in any order, falls within the scope of the present disclosure.

As shown, a method 500 begins at step 502, where the hazard detector 116 prompts a user to look at a visual target within an environment. As described, visual targets, such as stickers, may be placed at known locations within the environment, and the hazard detector 116 may prompt the user to fixate his or her gaze on each of the visual targets in turn.

At step 504, the hazard detector 116 receives image frames captured by the environmental camera 122 and the eye-facing camera 124 at substantially the same time. Then, at step 506, the hazard detector 116 determines pupil locations within the image frame captured by the eye-facing camera 124. At step 508, the hazard detector 116 further determines a location of the visual target within the image frame captured by the environmental camera 122.

At step 510, the hazard detector 116 stores a correspondence between the pupil location determined at step 506 and the location of the visual target determined at step 508. As described, in some embodiments, such correspondences may be stored in, e.g., a matrix of correspondences, in order to create a mapping between the real-world and eye-tracker spaces that provides a 3D spatial calibration. Although described for simplicity with respect to an image frame captured by the eye-facing camera 124 and a corresponding image frame captured by the environmental camera 122, in some embodiments the steps 504-510 may be repeated for multiple image frames from videos captured by the eye-tracking camera 124 and the environmental camera 122.

At step 512, if there are more visual targets to look at, then the method 500 returns to step 502, where the hazard detector 116 prompts the user to look at another visual target. If, on the other hand, there are no more visual targets to look at, then the method 500 proceeds to step 514, where the hazard detector 116 (optionally) performs re-calibration on a continuous basis. For example, visual targets could be fixed throughout an environment, in which case the hazard detector 116 could perform re-calibration based on locations of the visual targets, as captured by the environmental camera 122, by determining whether the visual targets have moved from prior locations and adjusting the calibration to account for such movement.

Figure 6:
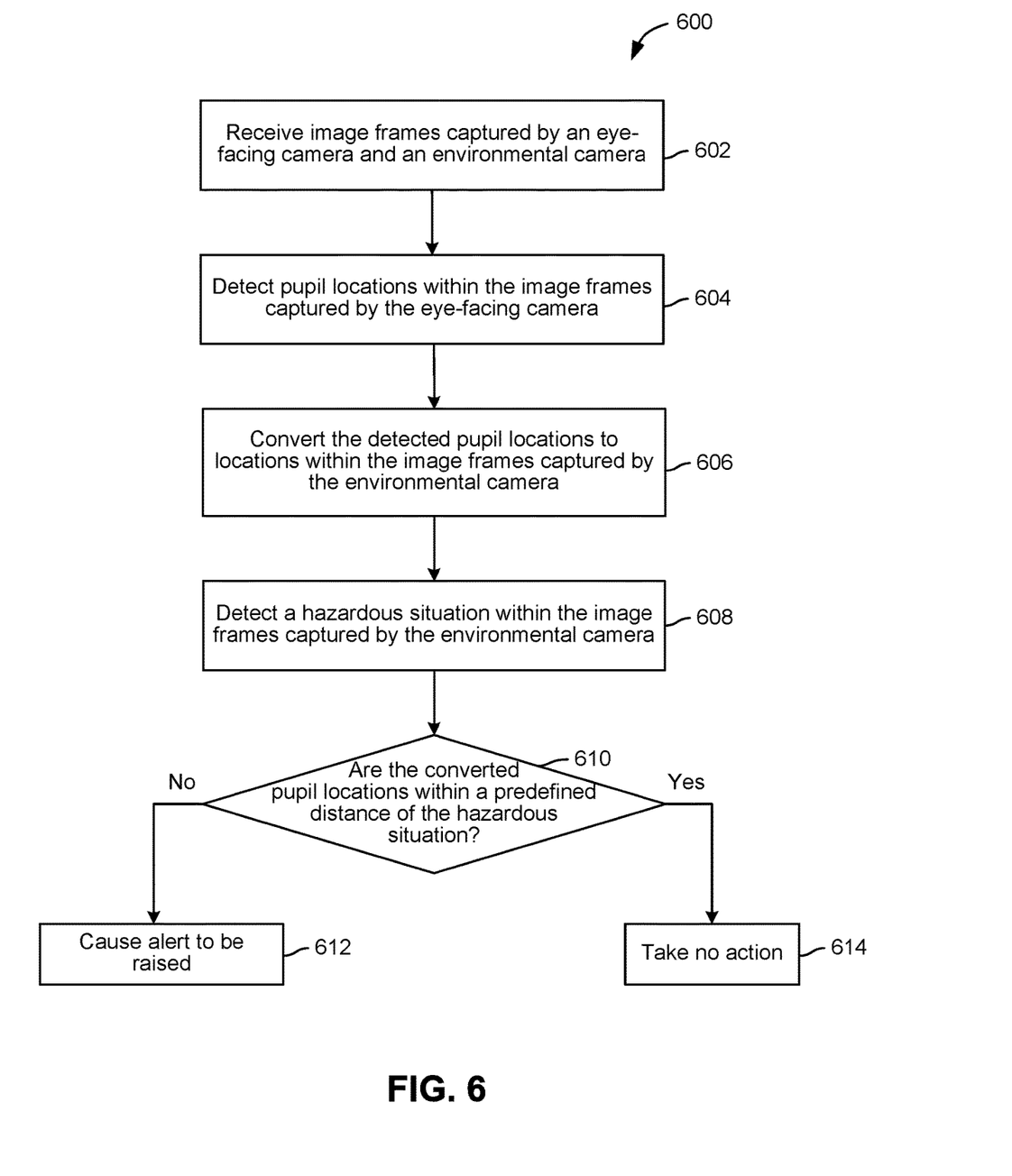
FIG. 6 sets forth a flow diagram of method steps for detecting and notifying a user of a hazard, according to various embodiments.

FIG. 6 sets forth a flow diagram of method steps for detecting and notifying a user of hazards, according to various embodiments. Although the method steps are described with reference to the systems of FIGS. 1-2, persons skilled in the art will understand that any system configured to implement the method steps, in any order, falls within the scope of the present disclosure.

As shown, a method 600 begins at step 602, where the hazard detector 116 receives image frames captured by the eye-facing camera 124 and the environmental camera 122. In some embodiments, image frames from the eye-facing camera 124 and the environmental camera 122 may be received and processed by parallel threads. For example, one thread could process image frames from the eye-facing camera 124 to determine pupil locations, a parallel thread could process image frames from the environmental camera 122 to detect hazards, and yet another thread could compare the pupil and hazard locations to determine if the user has looked at the hazard. In other embodiments, a single thread may be used to process both the image frames captured by the eye-facing camera 124 and the image frames from the environmental camera 122. For example, the single thread could iteratively process frames from the image frames captured by the environmental and eye-facing cameras 122 and 124, and compare the locations of hazards with pupil locations.

At step 604, the hazard detector 116 detects pupil locations within the image frames captured by the eye-facing camera 124. Then, at step 606, the hazard detector 116 converts the detected pupil locations to locations within the image frames captured by the environmental camera video. As described, the hazard detector 116 may perform such a conversion of pupil locations to locations in the environmental camera image frames using a mapping determined during calibration. The converted pupil locations may further be stored for comparison with the locations of hazards. In some embodiments, converted pupil locations may be stored for a up to predefined amount of time, as described above.

At step 608, the hazard detector 116 detects a hazard within the image frames captured by the environmental camera 122. As described, the hazard detector 116 may employ any technically feasible approach to detect hazards in the image frames, such as comparing the image frames to hazards encoded using template images, comparing features of the image frames to stored features of known hazards, feeding the images frames to a deep learning model trained to output objects as being hazardous or not, etc. Further, the hazards may be defined in terms of single objects that are hazardous, multiple objects that are in proximity to or otherwise associated with each other and hazardous together, objects whose appearances change over time (e.g., by increasing in size) indicating that the objects are getting more hazardous, etc.

At step 610, the hazard detector 116 determines whether the pupil locations converted to locations of the environmental camera image frames, as determined at step 608, are within a predefined distance of the hazard detected at step 612. As described, any technically feasible measure of distance may be used, such as pixel distances, real-world distances determined from pixel distances, whether the pupil locations have been within a bounding box of the hazard, etc. Further the hazard detector 116 may determine whether the converted pupil locations for a predefined amount of time (prior to the current time) are within the distance of the hazard. As described, the hazard detector 116 may store the pupil locations for a predefined amount of time, and delete pupil locations that are older than that amount of time. Doing so may avoid bombarding the user with distracting notifications of safety hazards that the user has already looked at and is already aware of. On the other hand, if the user has not looked at a hazard within the predefined amount of time, then the hazard detector 116 causes an alert to be generated.

As shown, if the hazard detector 116 determines that none of the (recently) converted pupil locations are within the predefined distance of the hazard, then the hazard detector 116 causes an alert to be generated at step 614. As described, the alert may include, e.g., a sound played via an audio device, vibration by a haptic device, a visual alert displayed via a display device, etc., or any other technically feasible alert, and the device(s) producing the alert may be integrated into the safety glasses 120, in the computing device 110, or elsewhere.

In other embodiments, additional and/or different requirements for raising an alert may be implemented. For example, the hazard detector 116 could be limited to raising no more than a predefined number of alerts in a given amount of time (e.g., five alerts per hour). As another example, the requirements may be individualized, such as dialing back the number of alerts that are generated after a user dismisses a number of previously generated alerts.

On the other hand, if the hazard detector 116 determines that any of the converted pupil locations are within the predefined distance of the hazard, then the hazard detector 116 takes no action at step 616, as the user has (recently) looked at the hazard.

Although discussed herein primarily with respect to environmental and eye-facing cameras mounted on safety glasses, some embodiments may also utilize data from other sensor sources. For example, the hazard detector 116 could also receive data from physiological sensor(s) such as a sensor that detects heart rate, an electroencephalogram (EEG), etc. and use such sensor data to determine whether a user has noticed and responded to a hazard. As another example, the hazard detector 116 could also receive data from sensors placed in the environment, such as cameras placed at various locations within the environment. In such a case, the sensors may, e.g., emit light that is tracked by the environment camera 122 such that a model can be built of the sensors' locations in the environment and eye gaze data can be correlated with data from the sensors. For example, a camera placed in the environment could capture images of standing water, and the hazard detector 116 could determine whether a user has looked at the standing water depicted in such images based on eye gaze data.

In sum, the disclosed techniques combine computer vision with eye tracking by identifying, via computer vision, safety hazards in image frames captured by an environmental camera and then alerting a user if the user has not (recently) noticed the hazard. Whether the user has noticed the hazard is determined based on eye tracking information obtained from image frames captured by an eye-tracking camera. The environmental and eye-tracking cameras are both mounted on safety glasses in some embodiments.

One advantage of the disclosed techniques relative to the prior art is that a pair of safety glasses is provided for automatically detecting and reporting safety hazards in a work environment, which differs from the manual identification of such hazards via a user's natural senses. In addition, the disclosed techniques leverage eye gaze data to accurately distinguish between hazards that the user has and has not noticed, so as to avoid distracting the user with unnecessary alerts of hazards that the user has already noticed. These technical advantages represent one or more technological advancements over prior art approaches.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating safety hazard alerts, the method comprising:
   receiving a first image frame captured by a first camera and at least one second image frame captured by a second camera, wherein the first camera and the second camera are secured to a pair of safety glasses, the first camera points away from a user wearing the safety glasses and towards an environment, and the second camera points toward the user;
   determining, based on the first image frame, a location of a hazard in the environment;
   determining, based on the at least one second image frame, at least one eye location;
   determining that the user has not noticed the hazard based on the location of the hazard and by mapping the at least one eye location to at least one gaze location in the first image frame via a mapping matrix storing a plurality of mappings from locations in image frames captured by the second camera to locations in image frames captured by the first camera, wherein the mapping matrix is computed using a set of target objects placed at predetermined locations within the environment;
   responsive to determining the user has not noticed the hazard, causing an alert to be generated; and
   performing a re-calibration based on another plurality of mappings from locations in other image frames captured by the second camera to locations in other image frames captured by the first camera.

2. The computer-implemented method of claim 1, wherein determining that the user has not noticed the hazard further includes:
   determining that the at least one gaze location in the first image frame is more than a predefined distance from the location of the hazard.

3. The computer-implemented method of claim 1, wherein causing the alert to be generated comprises at least one of causing an audio alert to be played by an audio device, causing a vibration to be produced by a haptic device, and causing a visual alert to be displayed by a display device.

4. The computer-implemented method of claim 3, wherein the safety glasses include at least one of the audio device, the haptic device, and the display device.

5. The computer-implemented method of claim 1, wherein determining the location of the hazard comprises:
   determining where a template image or features associated with the hazard appear within the first image frame;
   processing the first image frame using a machine learning model trained to identify hazardous objects; or
   determining that a size of a hazardous object increases between the first image frame and one or more additional image frames captured by the first camera.

6. A computer-readable storage medium including instructions that, when executed by a processor, cause the processor to generate a safety hazard alert by performing steps of:
   receiving a first image frame captured by a first camera and at least one second image frame captured by a second camera, wherein the first camera and the second camera are secured to a pair of safety glasses, the first camera points away from a user wearing the safety glasses and towards an environment, and the second camera points toward the user;
   determining, based on the first image frame, a location of a hazard in the environment;
   determining, based on the at least one second image frame, at least one eye location;
   determining that the user has not noticed the hazard based on the location of the hazard and by mapping the at least one eye location to at least one gaze location in the first image frame via a mapping matrix storing a plurality of mappings from locations in image frames captured by the second camera to locations in image frames captured by the first camera, wherein the mapping matrix is computed using a set of target objects placed at predetermined locations within the environment;

responsive to determining the user has not noticed the hazard, causing an alert to be generated; and performing a re-calibration based on another plurality of mappings from locations in other image frames captured by the second camera to locations in other image frames captured by the first camera.

7. The computer-readable storage medium of claim 6, wherein determining that the user has not noticed the hazard further includes:

determining that the at least one gaze location in the first image frame is more than a predefined distance from the location of the hazard.

8. The computer-readable storage medium of claim 7, wherein the predefined distance is a pixel distance.

9. The computer-readable storage medium of claim 7, wherein the predefined distance is a real-world distance converted from a pixel distance.

10. The computer-readable storage medium of claim 6, wherein causing the alert to be generated comprises at least one of causing an audio alert to be played by an audio device, causing a vibration to be produced by a haptic device, and causing a visual alert to be displayed by a display device.

11. The computer-readable storage medium of claim 10, wherein the safety glasses include at least one of the audio device, the haptic device, and the display device.

12. The computer-readable storage medium of claim 6, wherein determining the location of the hazard comprises:

determining where a template image or features associated with the hazard appear within the first image frame;

processing the first image frame using a machine learning model trained to identify hazardous objects; or determining that a size of a hazardous object increases between the first image frame and one or more additional image frames captured by the first camera.

13. A pair of safety glasses, comprising:

a frame;

one or more lenses;

a first camera secured to the frame, the first camera being pointed in front of the safety glasses and towards an environment; and a second camera secured to the frame, the second camera being pointed toward a back of the safety glasses, wherein the first camera and the second camera are coupled to a computing device for:

receiving a first image frame captured by the first camera and at least one second image frame captured by the second camera;

determining, based on the first image frame, a location of a hazard in the environment;

determining, based on the at least one second image frame, at least one eye location;

determining that the user has not noticed the hazard based on the location of the hazard and by mapping the at least one eye location to at least one gaze location in the first image frame via a mapping matrix storing a plurality of mappings from locations in image frames captured by the second camera to locations in image frames captured by the first camera, wherein the mapping matrix is computed using a set of target objects placed at predetermined locations within the environment;

responsive to determining the user has not noticed the hazard, causing an alert to be generated; and performing a re-calibration based on another plurality of mappings from locations in other image frames captured by the second camera to locations in other image frames captured by the first camera.

14. The safety glasses of claim 13, further comprising an output device.

15. The safety glasses of claim 14, wherein the output device is one of an audio device, a haptic device, and a display device.

16. The safety glasses of claim 13, further comprising a data cable or a wireless communication device.

* * * * *